Nov. 12, 1963 W. I. JONES 3,110,069
PLASTIC SIDE WING MOLDING FASTENER
Original Filed April 1, 1958

Inventor:
Walter I. Jones,
by Gordon Needleman
Atty.

United States Patent Office 3,110,069
Patented Nov. 12, 1963

3,110,069
PLASTIC SIDE WING MOLDING FASTENER
Walter I. Jones, Belmont, Mass., assignor to United-Carr Fastener Corporation, Cambridge, Mass., a corporation of Delaware
Continuation of application Ser. No. 725,665, Apr. 1, 1958. This application Apr. 26, 1963, Ser. No. 275,933
7 Claims. (Cl. 24—73)

My invention aims to provide improvements in fastener members for molding and like decorative installations.

This application is a continuation of application Serial No. 725,665, filed April 1, 1958, and now abandoned.

Fasteners for holding trim moldings to various supports such as automobile bodies, refrigerators, etc., have been in use for many years and they have taken on various shapes and been applied in many ways. In most instances, the fasteners have been made of metal and have been formed from a single or several pieces of material. More recently, these molding fasteners have been constructed along the lines shown in United States Letters Patents Nos. 2,695,434 and 2,695,435, issued November 30, 1954, to W. A. Bedford, Jr.

My improved fastener is particularly, though not exclusively, directed to improving this particular type of device having a screw and nut fastening means for holding the fastener in place and holding the parts of the installation together.

An object of my invention is to provide a molding fastener with a relatively rigid molding engaging head portion, a yieldable molding engaging portion and a rigid shank (for receiving a nut or for riveting), to hold the parts in place, the fastener preferably being formed from a single piece of suitable material.

A further object of my invention is to provide a fastener with an integral (preferably flexible) sealing portion.

Another object of my invention is to form a fastener from strong plastic material, preferably of the injection moldable type of plastic, strong durable, resistant to heat and having a shank adapted to receive a self-threading nut or to be riveted (cold or hot) thereby to hold the fastener to a support.

An important object of my invention is to provide a simple one-piece fastener that is easy to manufacture, eliminates preassembly of the fastener parts, eliminates threading of the attaching shank and, when desirable, eliminates the necessity of using a nut to assemble the parts of the installation with which the fastener may be used.

Other objects of the invention will appear from a further specific description of my invention and particularly as set forth in the claims which follow.

Referring now to the embodiment of my invention illustrated by the drawings.

Figure 1:
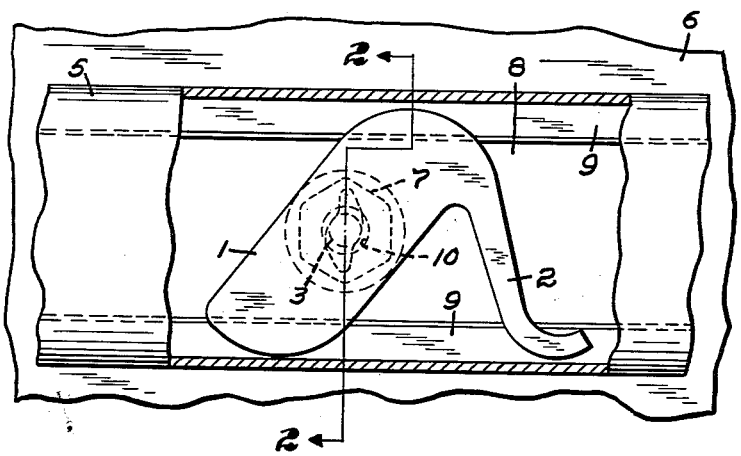
FIG. 1 is a plan view of an installation with portions broken away ot show the application of my improved fastener.
Figure 2:
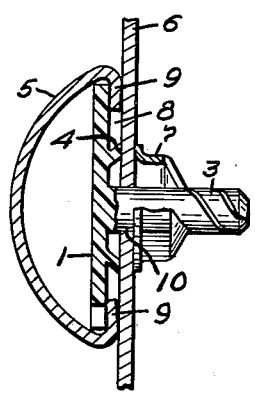
FIG. 2 is a section taken on the line 2—2 of FIG. 1.
Figure 3:
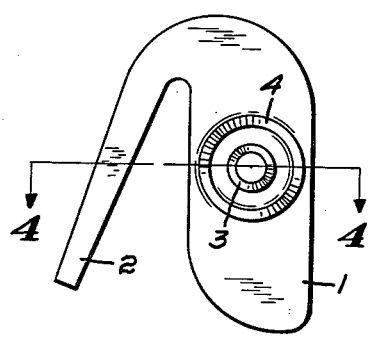
FIG. 3 is a bottom plan view of one form of my fastener per se.
Figure 4:
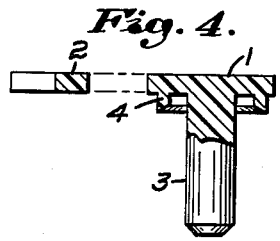
FIG. 4 is a section taken on the line 4—4 of FIG. 3.
Figure 5:
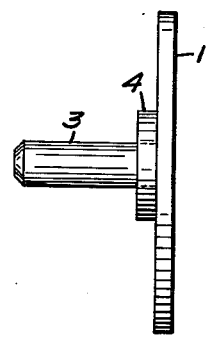
FIG. 5 is an edge view of the fastener shown in FIG. 3.

The particular embodiment of my invention illustrated in FIGS. 1 through 5 of the drawings includes a one-piece fastener. This fastener is preferably formed from suitable injection molded so-called plastic material (such as material now popularly known as nylon) and has a relatively rigid head portion 1, a yieldable molding engaging finger portion 2 and an attaching shank 3 and a flexible sealing portion 4. As illustrated in FIGS. 1 and 3, my unitary one-piece, molded plastic fastener has the relatively rigid head portion 1 in the form of a rigid cross-plate having two diagonally opposite rounded corners. The yieldable molding engaging plastic finger portion 2 is elongated in form and as a result possesses flexibility substantially throughout its length. The finger portion 2 is integrally united at one end to the cross-plate at one side thereof adjacent a non-rounded corner thereof, and extends therefrom in the same plane as and in the direction of the other end of the cross-plate or head portion 1, and in spaced angular relationship with respect thereto. The free end of the finger portion 2 is adapted to engage within an inturned flange of a molding strip in a manner to be more fully described hereinafter. The integral attaching shank 3 extends from one face of the head portion or cross-plate 1 in substantially transverse relationship thereto. These major portions of my improved fastener may be shaped and arranged in any suitable combination to suit the application, to which it may be applied.

One such application includes a suitable molding strip 5 (FIGS. 1 and 2), a support 6 and a nut 7. In this particular application, the fastener is applied to the molding through the space 8 between the inturned flanges 9—9 of the molding strip 55 and rotated into place so that the end portions of the head portion 1 may rest on the flanges 9—9 and the finger portion 2 presses against the molding to hold the parts in assembly. The shank 3 (preferably unthreaded) extends from beneath the head 1 through an aperture 10 in the support 6 and a self-threading nut 7 is applied to hold all of the parts together as shown in FIG. 2.

In many cases it is important to seal the application against the entrance of water or moisture, therefore, I have provided the integral annular sealing portion 4 which is compressed against the support 6 (FIG. 2) around the aperture 10, thereby effectively sealing the application.

Figure 6:
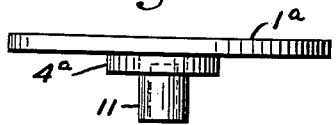
FIG. 6 is an edge view of a modified form of my fastener.
Figure 7:
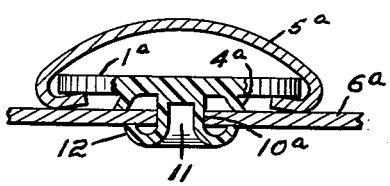
FIG. 7 is a section of an installation of my modified form of fastener shown in FIG. 6.

Referring now to the construction shown in FIGS. 6 and 7 the fastener is the same as in FIGS. 1 to 5 inclusive except that the shank is in the form of a rivet 11 (preferably hollow) which may be riveted against the support 6a, thereby eliminating the use of a nut.

This construction also adds to the sealing effect of the installation since the turned over portion 12 of the rivet 11 co-operates with the sealing portion 4a, thereby sealing the installation at both sides of the support 6a adjacent the aperture 10a.

It is important to bear in mind that my improved fastener is simple, inexpensive and provides all of the advantages of previously known devices for the same purposes, while being rust-proof, sound deadening, of less weight and positive in its holding ability.

While I have illustrated and described preferred embodiments of my invention, reference is made to the following claims for the best description of my invention.

I claim:

1. A unitary, one-piece fastener for assembly with a molding or the like for securing same to a support, comprising a relatively rigid, solid mass, molding-engaging, elongated plastic cross-plate, a single yieldable plastic finger portion integrally formed at one end with said cross-plate along one side edge immediately adjacent one corner thereof and extending outwardly therefrom and in the same plane thereto, and in angular offset relationship therewith, said finger portion having its width diminishing gradually outwardly to its free end and being flexible substantially throughout its length with the free end thereof being at least as flexible as the end united to said cross-plate and extending outwardly from the side edge of said cross-plate in the same plane as and in laterally spaced angular relationship therewith with the free end thereof adapted for engagement with said molding, and an attaching portion extending from one surface of said cross-plate in substantially right angle relationship thereto for attaching same to a support.

2. A unitary, one-piece molded plastic fastener for assembly with a molding or the like for securing same to a support member, said molding having inturned flanges along the side edges thereof forming opposing recesses, said fastener comprising a relatively rigid, solid mass, elongated plastic cross-plate for spanning the distance between the inturned edges of said molding, said cross-plate having diagonally opposite rounded corners, a single yieldable plastic finger portion integrally formed at one end with said cross-plate along one side edge adjacent a corner other than said diagonally opposite rounded corners thereof, said finger portion being flexible substantially throughout its length with the free end thereof being of a width less than the width of the end united to said cross-plate thereby rendering the free end thereof more flexible, said finger portion extending outwardly from the side edge of said cross-plate in the same plane as and in spaced angular relationship therewith with the free end thereof adapted for engagement within an opposed recess of said molding, and an attaching, substantially cylindrical, plastic shank portion integrally formed with and extending from one surface of said cross-plate in substantially right angle relationship thereto for extending through the opening in a support member for the molding.

3. A plastic fastener in accordance with claim 1, including a plastic sealing portion inwardly spaced from the periphery of said cross-plate, and being integral with and extending from said cross-plate in the same direction and surrounding said attaching plastic shank portion.

4. A plastic fastener in accordance with claim 1, wherein the plastic shank portion is threadless and being adapted to make self-threading engagement with a nut member.

5. A unitary, one-piece, molded plastic fastener for assembly with a molding or the like for securing same to a support, comprising a relatively rigid, solid mass, molding-engaging, elongated plastic cross-plate, a single yieldable plastic finger portion integrally formed at one end with said cross-plate along one side edge immediately adjacent one corner thereof and extending outwardly therefrom and in the same plane thereto, and in angular offset relationship therewith, said finger portion having its width diminishing gradually outwardly to its free end and being flexible substantially throughout its length with the free end thereof being at least as flexible as the end united to said cross-plate and extending outwardly from the side edge of said cross-plate in the same plane as and in spaced angular relationship therewith with the free end thereof adapted for engagement with said molding, and an attaching, substantially cylindrical, plastic riveting shank portion integrally formed with and extending from one surface of said cross-plate in substantially right angle relationship thereto and adapted to have its free end riveted outwardly to attach the fastener to a support.

6. A unitary, one-piece fastener for assembly with a molding or the like for securing same to a support, comprising a relatively rigid, solid mass, molding-engaging, elongated plastic cross-plate, a single yieldable plastic finger portion integrally formed at one end with said cross-plate along one side edge immediately adjacent one corner thereof and extending outwardly therefrom and in the same plane thereto, and in angular offset relationship therewith, said finger portion being flexible substantially throughout its length with the free end thereof being at least as flexible as the end united to said cross-plate and extending outwardly from the side edge of said cross-plate in the same plane as and in laterally spaced angular relationship therewith with the free end thereof adapted for engagement with said molding, and an attaching portion extending from one surface of said cross-plate in substantially right angle relationship thereto for attaching same to a support.

7. A unitary, one-piece molded plastic fastener for assembly with a molding or the like for securing same to a support member, said molding having inturned flanges along the side edges thereof forming opposing recesses, said fastener comprising a relatively rigid, solid mass, elongated plastic cross-plate for spanning the distance between the inturned edges of said molding, said cross-plate having diagonally opposite rounded corners, a single yieldable plastic finger portion integrally formed at one end with said cross-plate along one side edge adjacent a corner other than said diagonally opposite rounded corners thereof, said finger portion being flexible substantially throughout its length, said finger portion extending outwardly from the side edge of said cross-plate in the same plane as and in spaced angular relationship therewith with the free end thereof adapted for engagement within an opposed recess of said molding, and an attaching, substantially cylindrical, plastic shank portion integrally formed with and extending from one surface of said cross-plate in substantially right angle relationship thereto for extending through the opening in a support member for the molding.

References Cited in the file of this patent

UNITED STATES PATENTS

| | | |
|---|---|---|
| Re. 23,876 | Poupitch | Sept. 21, 1954 |
| 2,762,398 | Adam | Sept. 11, 1956 |
| 2,796,647 | Bedford | June 25, 1957 |
| 2,948,937 | Rapata | Aug. 16, 1960 |